US007456398B2

(12) United States Patent
Senko et al.

(10) Patent No.: US 7,456,398 B2

(45) Date of Patent: Nov. 25, 2008

(54) EFFICIENT DETECTION FOR ION TRAPS

(75) Inventors: Michael W. Senko, Sunnyvale, CA (US); Scott T. Quarmby, Round Rock, TX (US); George B. Guckenberger, Austin, TX (US)

(73) Assignee: Thermo Finnigan LLC, San Jose, CA (US)

(*) Notice: Subject to any disclaimer, the term of this patent is extended or adjusted under 35 U.S.C. 154(b) by 447 days.

(21) Appl. No.: 11/429,184

(22) Filed: May 5, 2006

(65) Prior Publication Data

US 2008/0067361 A1 Mar. 20, 2008

(51) Int. Cl.
*B01D 59/44* (2006.01)

(52) U.S. Cl. ........................ 250/292; 250/281; 250/282

(58) Field of Classification Search .......... 250/281–300
See application file for complete search history.

(56) References Cited

U.S. PATENT DOCUMENTS 4,540,884 A 9/1985 Stafford et al.
5,285,063 A 2/1994 Schwartz et al.
5,386,113 A 1/1995 Franzen et al.
5,420,425 A 5/1995 Bier et al.
6,797,950 B2 9/2004 Schwartz et al.
6,940,066 B2 * 9/2005 Makarov et al. ............ 250/287
7,265,346 B2 * 9/2007 Whitehouse et al. ........ 250/287
7,385,187 B2 * 6/2008 Verentchikov et al. ...... 250/287
2004/0149900 A1 * 8/2004 Makarov et al. ............ 250/287
2007/0029473 A1 * 2/2007 Verentchikov .............. 250/281

* cited by examiner

*Primary Examiner*—Jack I Berman
*Assistant Examiner*—Andrew Smyth
(74) *Attorney, Agent, or Firm*—Sharon Upham

(57) ABSTRACT

An apparatus and method are disclosed for efficient detection of ions ejected from a quadrupolar ion trap, in which the ions are ejected as first and second groups of ions having different directions. The first and second groups of ions are received by a conversion dynode structure, which responsively emits secondary particles that are directed to a shared detector, such as an electron multiplier. The conversion dynode structure may be implemented as a common dynode or as two dynodes (or sets of dynodes), with each dynode positioned to receive one of the groups of ions.

26 Claims, 5 Drawing Sheets

EFFICIENT DETECTION FOR ION TRAPS

FIELD OF THE INVENTION

The disclosed embodiments of the present invention relate generally to the field of mass spectrometers and more specifically to methods and apparatus for detecting ions ejected from a quadrupolar ion trap.

BACKGROUND OF THE INVENTION

The resonant ejection scan is a well-known technique for performing mass analysis in an ion trap mass spectrometer. Generally described, the resonance ejection scan utilizes a supplemental oscillatory voltage applied across opposing electrodes of the ion trap. As the main trapping voltage is ramped, ions are brought into resonance in order of their mass-to-charge ratios. The amplitude of motion of the resonantly excited ions increases in the dimension defined by the opposing electrodes until the ions either strike the electrode surfaces or are ejected from the trap through one or more apertures aligned with the dimension of excitation. In a three-dimensional quadrupolar ion trap, resonantly excited ions are ejected from the trap in approximately equal numbers through two opposing apertures located in the end cap electrodes. However, because only those ions that exit the trap through one of the apertures are detected (the other aperture is employed for ion injection) about fifty percent of the ejected ions are lost, thereby adversely affecting sensitivity.

In a conventional two-dimensional (linear) quadrupolar ion trap, substantially all the ejected ions may be detected by adapting both opposed electrodes to which the resonance excitation voltage is applied (e.g., both central X rods) with elongated apertures or slots through which the resonantly excited ions may be ejected, and by providing two separate dynode/detector arrangements, each dynode/detector arrangement being positioned to detect ions ejected through one of the opposed slots. However, the inclusion of two separate dynode/detector arrangements can significantly increase the instrument complexity and manufacturing cost, particularly since each dynode/detector arrangement and its associated components typically require a dedicated power supply of significant expense. Of course, the cost of the instrument may be reduced by eliminating one of the dynode/detector arrangements and detecting only those ions that are ejected through one of the slots, but this configuration results in the loss of about half of the detectable ions and consequently produces a reduction in overall sensitivity of about 50 percent.

In view of the limitations of prior art ion trap mass spectrometers discussed above, there is a need for an ion trap mass spectrometer that avoids the high costs associated with multiple detectors, but which provides a substantially higher degree of sensitivity relative to known instrument designs in which a significant portion of the ejected ions are discarded.

SUMMARY

In accordance with one aspect of the present invention, an apparatus and method are disclosed that allows for efficient detection of ions ejected from a quadrupolar ion trap, such as a two-dimensional ion trap. The quadrupolar ion trap is conventionally configured to eject at least first and second groups of ions, the first group of ions being ejected in a direction different from the second group of ions. The first and second groups of ions travel on paths that terminate at an ion conversion dynode structure, which may be a common dynode or may consist of first and second dynodes (or sets of dynodes), each of which is positioned to receive a corresponding one of the ion groups. The secondary particles emitted from the ion conversion structure are subsequently directed to a shared detector, which responsively generates a signal representative of the numbers of secondary particles incident thereon, which in turn represents the combined number of ions in the first and second groups. In some implementations of the invention, the dynode structure is configured to perform an energy-filtering function, by which a significant portion of non-resonantly ejected ions travel on paths that do not result in the production of detectable secondary particles. Significant cost savings may be achieved by eliminating the need to provide a second detector.

BRIEF DESCRIPTION OF THE DRAWINGS

For a better understanding of the nature and objects of the invention, reference should be made to the following detailed description, taken in conjunction with the accompanying drawings, in which.

Like reference numerals refer to corresponding parts throughout the several views of the drawings.

DETAILED DESCRIPTION OF EMBODIMENTS

Figure 1:
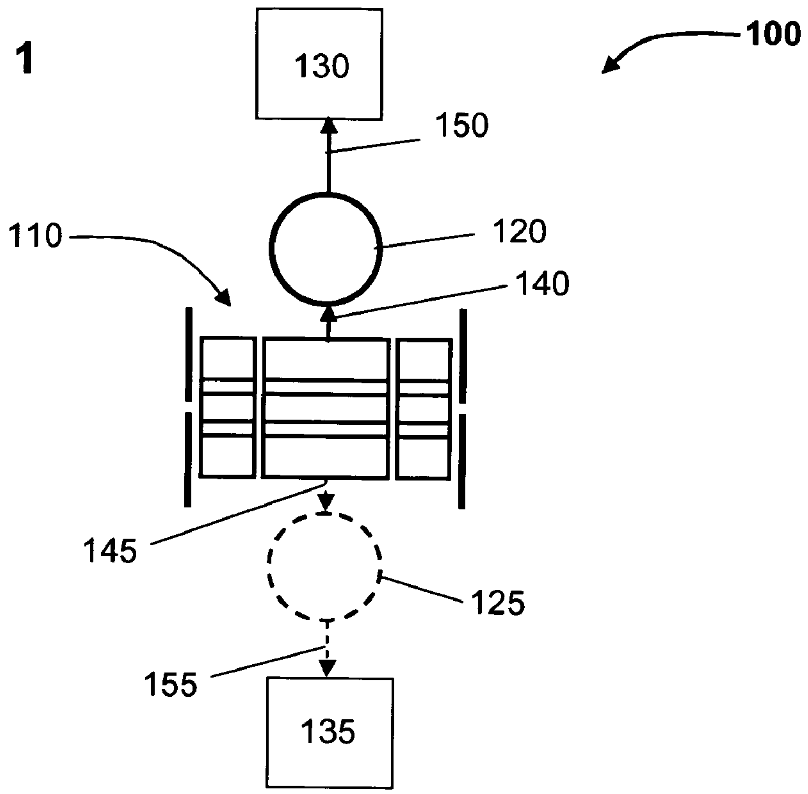
FIG. 1 is a schematic illustration showing a typical a two-dimensional linear quadrupolar ion trap and detector arrangement.

FIG. 1 schematically illustrates a typical two-dimensional linear quadrupolar ion trap system 100 according to the prior art. The system 100 comprises a linear quadrupolar ion trap 110, a conversion dynode 120, and an associated detector 130. The combination of the conversion dynode 120 and the detector 130 enable a parameter indicative of the number of ions ejected from one side of the linear ion trap 110 to be measured. Also illustrated in dotted lines is an additional combination of second conversion dynode 125 and second detector 135, which enable ions ejected from the other side of the linear ion trap 110 to be detected. As illustrated, each detector 130, 135 typically comprises an electron multiplier and a detector circuit. In general, the conversion dynodes, electron multipliers and detector circuits are powered by their own discrete power supplies. A single detector circuit can be utilized to detect the charged particles emanating from the two electron multipliers, but two electron multipliers are required.

It should be recognized that different system configurations for the quadrupolar ion trap may be used, as are well known by the art. For example, the quadrupolar ion trap can be configured such that ions are ejected axially from the ion trap rather than radially. Alternative methods of ion detection can also be applied.

Figure 2A:
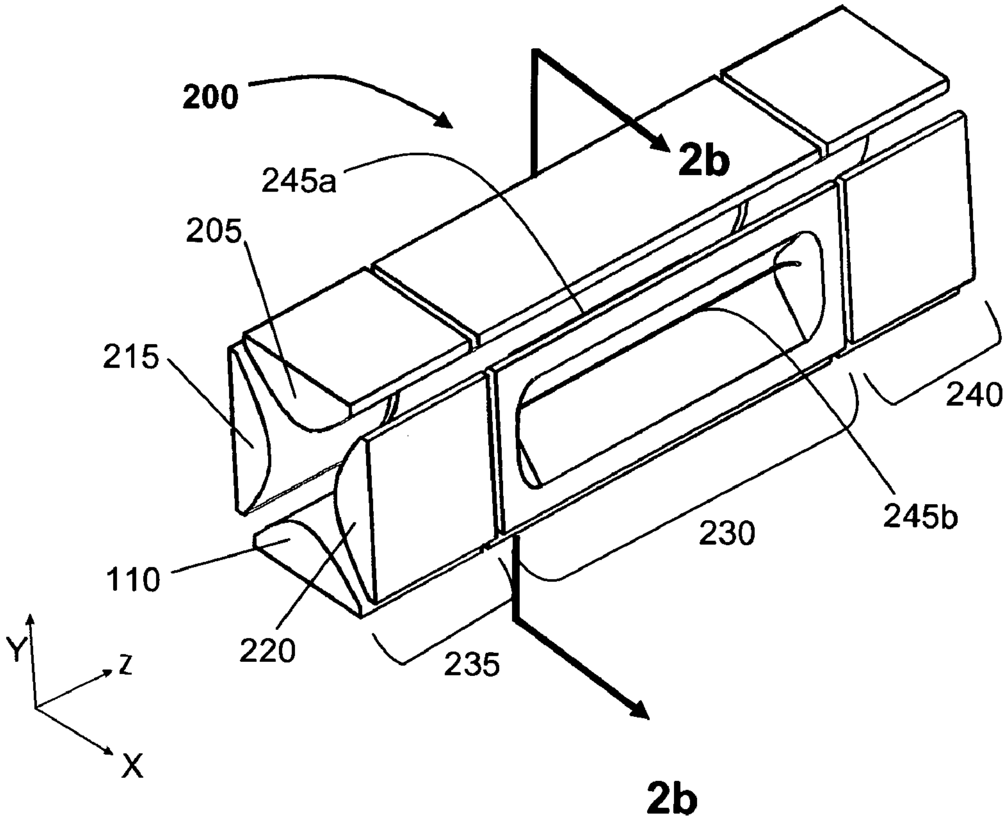
FIG. 2 is a schematic illustration showing a typical two-dimensional linear quadrupolar ion trap.
Figure 2B:
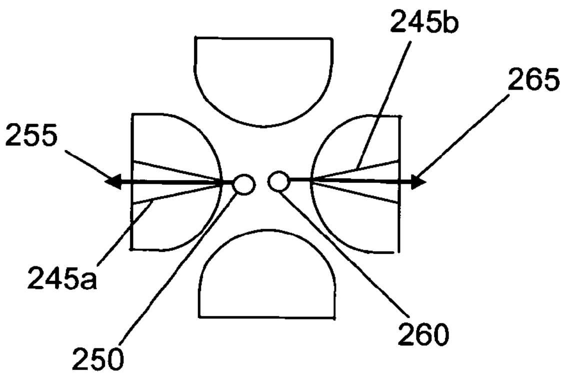

FIG. 2(*a*) illustrates a conventional three-sectioned linear ion trap 110 as described in detail in U.S. Pat. No. 5,420,425, which is incorporated herein by reference. The ion trap 110 takes the form of a quadrupole structure having two sets of opposing elongated electrodes (referred to herein as "rods") that define an elongated internal volume having a central axis along a z dimension of a coordinate system. A Y set of opposing rods includes rods 205 and 210 aligned with the y-axis of the coordinate system, and an X set of opposing rods includes rods 215 and 220 aligned with the x-axis of the coordinate system. As depicted, each of the rods 205, 210, 215, 220 may be divided into three sections, thereby defining a trap main or central segment 230 and trap front and back segments 235 and 240.

The ions are radially contained within the internal volume of ion trap 110 by the substantially quadrupolar field created by applying suitable radio-frequency (RF) trapping potentials to the X and Y rod sets. To constrain ions axially (in the z dimension), the sections of the X and Y rod sets corresponding to the central segment 230 may receive a DC potential that is different from (raised or lowered relative to, depending on the polarity of the trapped ions) DC potentials applied to the front and back segments 235 and 240. Thus a DC "potential well" may be formed in the z dimension that, coupled with the radial containment afforded by the quadrupole field, enables containment of ions in all three dimensions.

To permit radial ejection of ions from ion trap 110, the central sections of rods 215 and 220 (the X rod set) are adapted with apertures 245*a* and 245*b* that have lengths roughly coextensive with the length of the trap central segment 230. The apertures 245*a* and 245*b* may be seen more clearly in the cross-sectional view of ion trap 110 depicted in FIG. 2(*b*). As described above, a mass spectrum of the ions contained within ion trap 110 may be acquired by applying a dipole resonant excitation voltage across the apertured rods 215 and 220, and progressively varying one or more of the trapping parameters (e.g., the RF trapping voltage) such that ions are brought into resonance with the field arising from the applied resonance excitation voltage in order of their mass-to-charge ratios (m/z's). The resonantly excited ions develop trajectories that exceed the boundaries of the trapping volume, and are ejected from ion trap through one of apertures 245*a*, 245*b*. As shown in FIG. 2(*b*), the ejected ions leave ion trap as two groups of ions: a first group of ions 250 traveling in a first direction indicated by arrow 255, and a second group of ions 260 traveling in a second direction 265 that is approximately opposite to the first direction. Those skilled in the art will recognize that the ion paths followed by individual ejected ions will vary slightly, and that the directions depicted in the figure represent average or aggregate directions of the ejected ions which go on to strike the conversion dynodes 120, 125.

The first and second group of ions 250 and 260 travel along respective paths 140 and 145 that terminate at conversion dynodes 120 and 125 (as illustrated in FIG. 1). As is known in the art, conversion dynodes 120 and 125 are devices that emit secondary particles when they are struck by ions. The numbers of emitted secondary particles, which may include electrons, ions and neutral species, are representative of the numbers of ions impinging on the dynode surfaces. Conversion dynodes 120 and 125 are maintained at an elevated potential, which will be either positive or negative depending on the polarity of the ions to be detected. As is also known in the art, each conversion dynode 120 and 125 may include a single dynode element or multiple dynode elements arranged in a cascading configuration.

Secondary particles emitted from conversion dynodes 120 and 125 travel respectively along paths 150 and 155 and subsequently reach detectors 130 and 135. Detectors 130 and 135 generate signals having amplitudes indicative of the numbers of secondary particles arriving at the detector, which in turn is representative of the abundances of ions ejected from ion trap 110.

The detectors 130, 135 can take the form of any conventional detector arrangement, for example, a single external detector such as an electron multiplier or a Faraday collector configured radially with respect to the linear ion trap 110. The placement and type of conversion dynode 120, 125 and detectors 130, 135 may vary. For some geometries, a microchannel plate detector with an appropriate dynode may be optimum. In another geometry, the detectors may extend along the length of the central segment 230 of linear ion trap 110.

It should be recognized that although the term "detector" is sometimes used in the mass spectrometer art to denote an assembly comprising a dynode structure and an electron multiplier or equivalent device capable of generating a signal responsive to receipt of secondary particles from the dynode structure, the use of the term "detector" herein refers only to the electron multiplier or equivalent device.

An electron multiplier is an apparatus in which current amplification is realized through secondary emission of electrons. There are two general types of electron multipliers: discrete dynode multipliers and continuous dynode multipliers. In discrete dynode electron multipliers, the electron multiplication region is defined by a plurality of discrete dynodes. An ion or electron strikes the first dynode, resulting in the emission of several electrons. These secondary electrons are then attracted to the second dynode, where each electron produces several more electrons and so on. Continuous dynode multipliers do not have separate, discrete dynodes. Instead, a tube-like structure is processed to exhibit the multiple secondary emission properties. The output of the electron multiplier is pre-amplified by a pre-amplifier and supplied to an associated processor (not shown). The detection signals obtained by the ion detector are amplified and then forwarded to a data processing system.

For two-dimensional linear ion traps, operated under standard radial ejection conditions, ions leave the ion trap symmetrically, with about half the ions exiting rod 215 through aperture 245*a* and the other half exiting rod 220 through aperture 245*b*.

Each component of the ion conversion and detection system, for example the conversion dynodes 120, 125 and the detectors 130, 135, for example, is typically powered by its own dedicated power supply. For efficient detection, two dynodes 120, 125 and detectors 130, 135 are required. With the exception of the dynode power supply, all other costs associated with the detector arrangement double (dynodes, electron multipliers, electron multiplier power supplies). As a cost reduction measure, as indicated in FIG. 1 and discussed above, a single dynode 120 and detector 130 may be substituted for the dual dynode/detector structure shown in FIG. 2(*b*) with the adverse result of a loss of detectable ions and hence in detection efficiency of about fifty percent.

Figure 3:
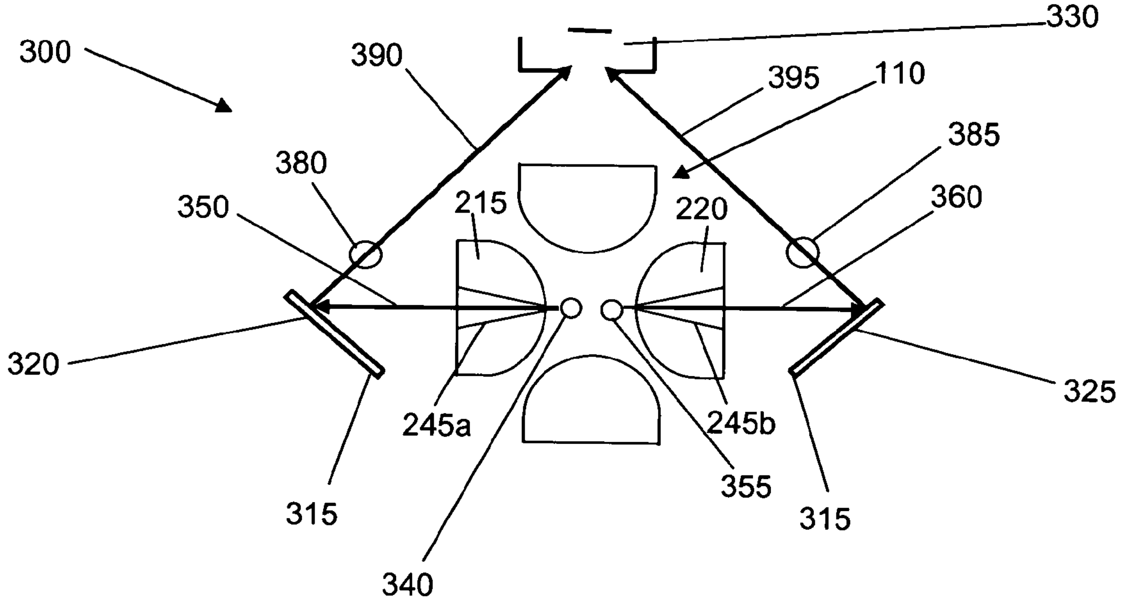
FIG. 3 illustrates the disposition of the ion conversion dynodes and the detector for a two-dimensional linear quadrupolar ion trap according to one aspect of the invention.

FIG. 3 illustrates schematically in cross-sectional view a linear quadrupolar ion trap system 300 according to a first embodiment of the invention which removes the need for a second detector and the associated electronics. In this system, ions ejected through both of the apertures 245*a* and 245*b* of the X-rods 215, 220 of the linear quadrupolar ion trap 110 are measured using a shared detector 330.

The quadrupolar ion trap system 300 comprises linear quadrupolar ion trap 110, a conversion dynode structure 315 including two conversion dynodes 320 and 325, and a shared detector 330, which may take the form of an electron multiplier. As will be discussed in further detail below, secondary particles emitted from both conversion dynodes 320 and 325 are directed toward shared detector 330, such that shared detector 330 generates a signal representative of the numbers of ions ejected through both apertures. In this particular configuration, a conversion dynode structure 315 is provided having a first conversion dynode 320 positioned proximal to aperture 245*a*, and a second conversion dynode 325 positioned proximal to aperture 245*b*. Shared detector 330 is positioned above ion trap 110 as shown.

In operation, ions are ejected from ion trap 110 in two different directions, as described above in connection with FIG. 2(*b*). A first group of ions 340 is ejected from aperture 245*a* in a first direction indicated by the arrow 350. A second group of ions 355 (of approximately equal abundance to the first group of ions 340) is ejected from aperture 245*b* in a second direction (indicated by arrow 360) that is opposite to the first direction. The first and second groups of ions 340 and 355 travel respectively along paths indicated by arrows 350 and 360 and strike conversion dynodes 320 and 325. Conversion dynodes 320, 325 respectively emit, responsive to the impingement of the first and second groups of ions thereon, first and second sets of secondary particles 380 and 385. The first and second sets of secondary particles 380 and 385 respectively travel along paths 390 and 395 (again, the indicated paths representing the average or aggregate path followed by the individual secondary particles), which each terminate at shared detector 330. Shared detector 330, which may be implemented as an electron multiplier, generates a signal representative of the total number of secondary particles (including both the first and second sets of secondary particles) that arrive at its surfaces.

It will be recognized that, in order for the secondary particle paths to converge at shared detector 330, suitable values will need to be selected for the relative spacings of the ion trap, conversion dynodes, and shared detector, for the angular orientation of the conversion dynodes, and for the static potentials applied to each of the components. These values may be selected, for example, by use of ion optics modeling software packages known in the art such as SIMION 3-D (available from Scientific Instrument Services of Ringoes, N.J.).

It should be noted that as with all figures presented herein to illustrate and discuss certain aspects of the invention, FIG. 3 illustrates just one implementation of the aspect discussed, and that other implementations are within the realm of the invention. For example, an alternative configuration of this system would comprise the conversion dynodes 320, 325 disposed one on either side of the ion trap 110 as shown, but with shared detector 330 displaced along the Z-dimension with respect to ion trap 110. In this configuration, the geometries of the ion trap and conversion dynodes and the applied voltages would be tailored such that the ion and/or secondary particle paths would have a component in the Z-dimension rather than lying in the plane of the FIG. 3 drawing. In another alternative configuration of FIG. 3, the conversion dynodes can be omitted, and ions from or secondary particles derived from the first and second groups of ions are received by the shared detector 330 directly.

Figure 4:
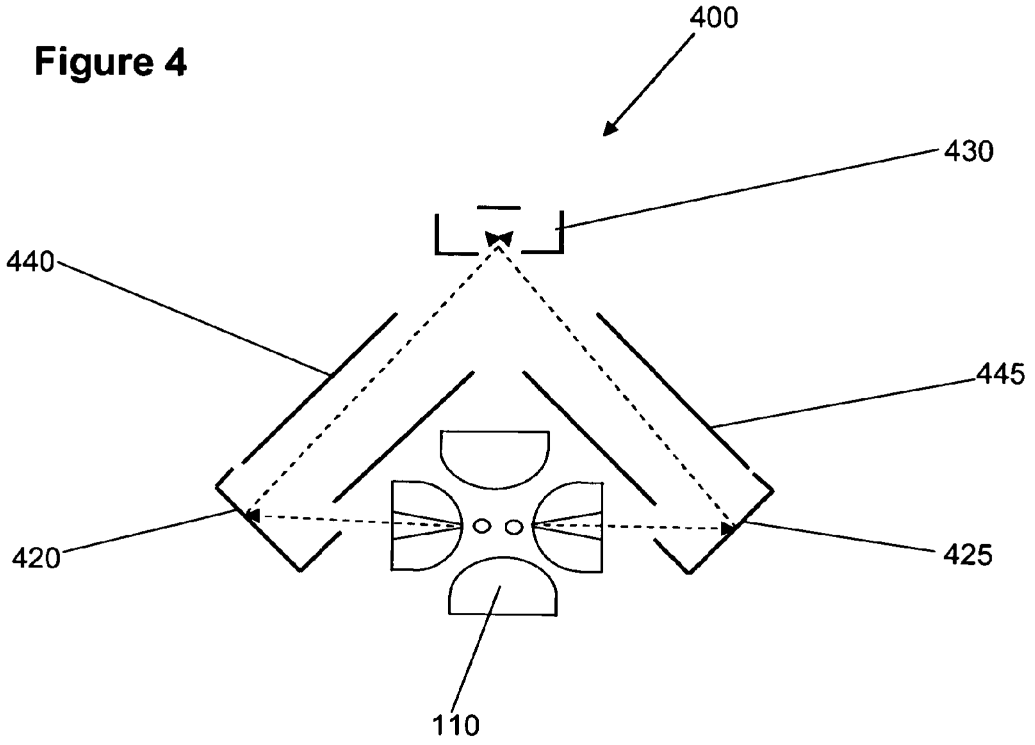
FIG. 4 illustrates the disposition of the ion conversion dynodes and the detector for a two-dimensional linear quadrupolar ion trap according to another aspect of the invention.

Functionality of the configuration illustrated in FIG. 3 may be somewhat limited due to the electric fields between the linear ion trap 110 and conversion dynodes 320, 325 not being conducive to focusing of secondary particles toward the shared detector 330. FIG. 4 illustrates an embodiment of a quadrupolar ion trap system 400 substantially similar to the embodiment of FIG. 3, but for which a focusing structure is provided. The focusing structure may take the form of two electrostatic lenses 440 and 445 to which appropriate potentials are applied, the first lens 440 being positioned adjacent conversion dynode 420 and serving to focus secondary particles emitted therefrom onto shared detector 430, and the second lens 445 being positioned adjacent conversion dynode 425 and focusing the emitted secondary particles onto shared detector 430. In an exemplary implementation of this embodiment, the linear ion trap 110 is maintained at ground, the conversion dynodes 420, 425 are maintained at −15 kV, the lenses 440, 445 are maintained at −14 kV, and the shared detector 430 is maintained at −1 kV. In this embodiment, the electric fields generated by lenses 440 and 445 assist to focus the secondary particles onto shared detector 430, thereby potentially improving detection efficiency. Focusing and resultant detection efficiency may be further improved by using a more complex arrangement of focusing elements. In one specific implementation, the voltages applied to lenses 440 and 445 or their equivalents can be supplied through a voltage divider (such as a chain of resistors) connected to one conversion dynode supply, significantly reducing manufacturing costs.

The FIG. 4 embodiment may be particularly advantageous for use in connection with an extended length (“long”) linear ion trap. In such traps, ions are ejected through apertures having lengths significantly greater than the length of the entrance to a standard detector. By appropriately shaping the lenses or other focusing structure disposed between the conversion dynodes and the shared detector, substantially all ions ejected from an extended length linear ion trap could be detected with a standard detector, thus avoiding the need to design and incorporate a customized detector having an elongated entrance (and the associated costs). In an alternative configuration of FIG. 4, the conversion dynodes can be omitted, and ions from or secondary particles derived from the first and second groups of ions are focused via a focusing structure prior to being received by the shared detector 430 directly.

Figure 5:
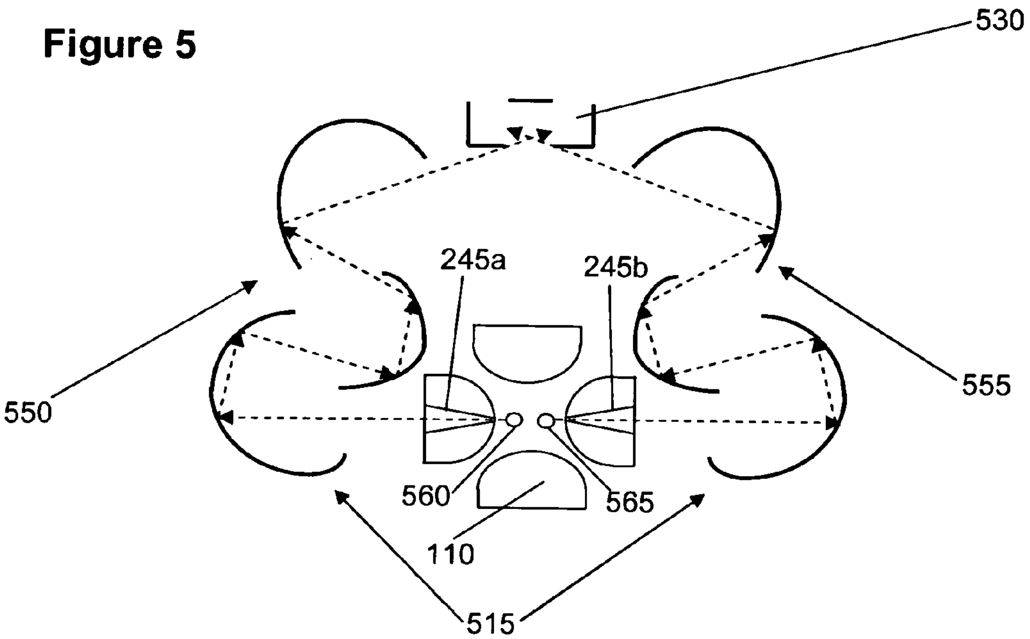
FIG. 5 illustrates the disposition of the ion conversion dynodes and the detector for a two-dimensional linear quadrupolar ion trap according to yet another aspect of the invention.

FIG. 5 illustrates yet another embodiment of the invention, in which a conversion dynode structure 515 takes the form of two sets of discrete dynodes: a first set of dynodes 550 positioned adjacent aperture 245*a* of ion trap 110, and a second set of dynodes 555 positioned adjacent aperture 245*b*. The first and second dynode sets 550 and 555 respectively receive the first and second groups of ions 560, 565 and responsively emit first and second sets of secondary particles, which are directed onto shared detector 530. In this case, each individual dynode is shaped and oriented so as to efficiently pass electrons on to the next individual dynode in the chain. Appropriate shaping and positioning of the individual dynodes would allow secondary particles arising from ions ejected from an extended length linear ion trap to be collapsed axially during each stage, with the axial extent of the secondary particles finally being reduced to the entrance length of a standard detector.

Figure 6:
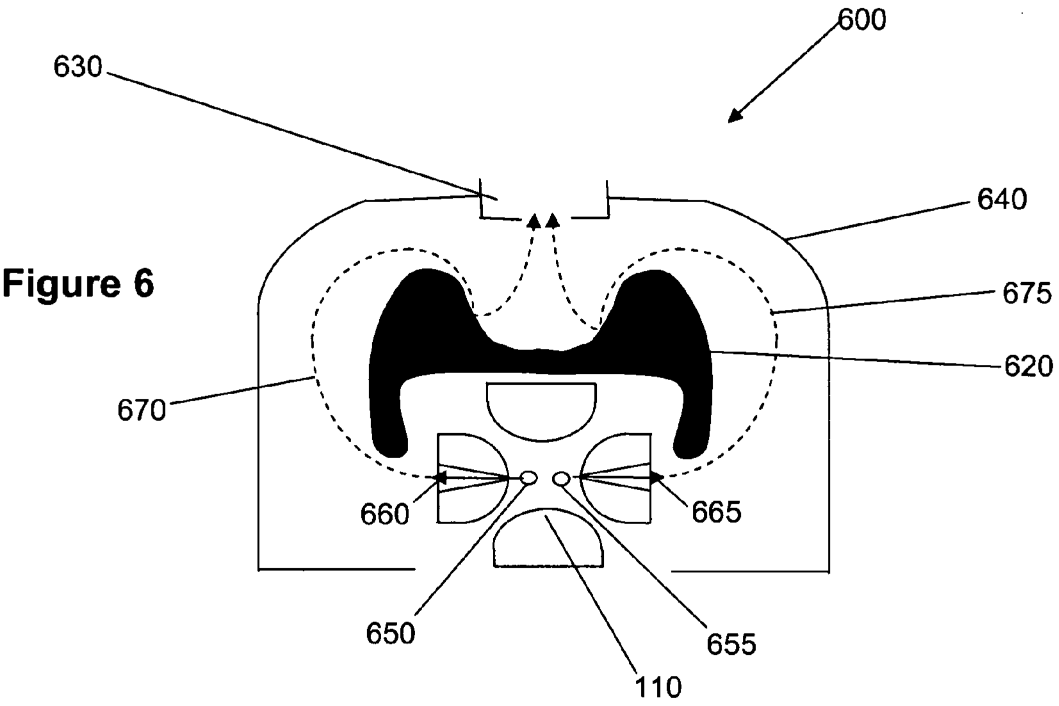
FIG. 6 illustrates the disposition of the ion conversion dynode and the detector for a two-dimensional linear quadrupolar ion trap according to a further aspect of the invention.

FIG. 6 illustrates an embodiment of an ion trap system 600 in which the conversion dynode structure consists of a common conversion dynode 620 placed above the ion trap 110. It should be recognized that the term “above” is used to denote position relative to the ion trap and is not intended to refer to different parts of the structure if the structure is inverted or rotated. The common conversion dynode 620 is shaped such that its upper surface (the surface facing shared detector 630) includes a central concave portion bracketed by convex lobes, although other suitable geometries may be substituted for the one depicted. A grounded shield 640 is placed around the conversion dynode 620 and the ion trap 110. By carefully selecting the geometry and placement of conversion dynode 620 and shield 640 and the potential applied to conversion dynode 620, both the first and second groups of ions (650 and 655), which are initially ejected from ion trap 110 in opposite directions indicated by arrows (660 and 665) may be directed under the influence of the resulting electric fields to travel on paths (670 and 675) that terminate at the upper surface of conversion dynode 620. Secondary particles emitted from conversion dynode 620 responsive to impingement thereon of both the first and second groups of ions travel to detector 630, which generates a signal representative of the numbers of secondary particles arriving at its surfaces. The central portion of the common dynode upper surface is provided with a concave shape so as to focus the secondary particles onto the shared detector 630 entrance.

Conversion dynode 620 may be adapted for use with an extended-length ion trap by shaping the conversion dynode to effect axial (Z-dimension) focusing of the first and second ions sets and the emitted secondary particles such that the axial extent of the secondary particles does not exceed the length of the entrance aperture of a standard-sized detector.

It should be noted that the selection of the dynode shaping and position and the applied potentials should take into account that the first and second groups of ions may be ejected at a very wide kinetic energy range (e.g., 100 eV to 4.5 keV). It is generally desirable to detect all of the ejected ions, so ion trap system 600 should be designed such that all ejected ions within an anticipated range of initial kinetic energies are directed on paths that take them to the dynode upper surface. In some situations, however, it may be advantageous to prevent ions having kinetic energies outside of a prescribed range from being detected. To achieve this objective, the ion trap system 600 design and operating parameters may be selected such that ions having kinetic energies outside of the prescribed range (or a significant portion thereof) will not reach the central portion of the dynode upper surface, and hence will not cause the emission of secondary particles measured by the detector. This "energy-filtering function" may be useful, for example, to avoid or minimize the appearance of artifact peaks arising from the ejection of certain ions at the instability limit rather than by resonance excitation. It is known that ions ejected at the instability limit will possess a range of initial kinetic energies that is different from the kinetic energy range possessed by resonantly ejected ions. Thus, in one implementation, ion trap system 600 may be designed and operated such that only resonantly ejected ions are detected, whereas the ions ejected at the instability limit exhibit paths that terminate at locations other than the central portion of the dynode upper surface (and hence do not produce detectable secondary particles.) It is noted that structures that provide an energy-filtering function and hence allow discrimination between resonantly and non-resonantly ejected ions may also be employed in conventional ion trap systems (those that do not employ the shared detector arrangement described herein).

It will be appreciated that the ion trap system 600 utilizes both a common conversion dynode and shared detector, thereby offering the potential for significant cost savings relative to conventional ion trap systems utilizing two dynodes and two detectors.

Figure 7:
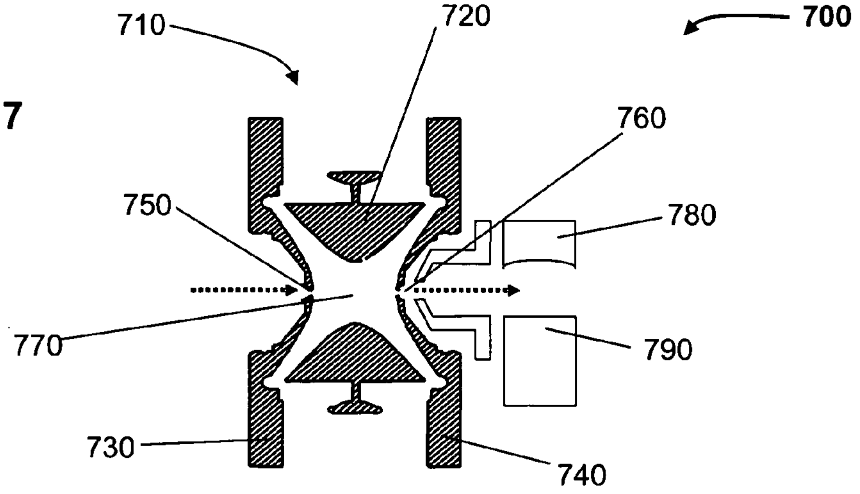
FIG. 7 is a schematic illustration showing a typical a three-dimensional quadrupolar ion trap and detector arrangement.

Other embodiments of the invention may be utilized in connection with conventional three-dimensional ion traps. FIG. 7 shows a typical three-dimensional quadrupolar ion trap system 700 according to the prior art that includes a three-dimensional quadrupolar ion trap 710 having a ring electrode 720 and first and second end cap electrodes 730 and 740 respectively. Each of the end cap electrodes 730, 740 has a central aperture 750, 760. Ions of interest are introduced through the entrance aperture 750 in the first end cap electrode 730 into the three-dimensional quadrupolar ion trap 710. Ions are ejected from the trapping volume through both entrance aperture 750 and exit aperture 760; however, only those ions ejected through exit aperture 760 are detected (via dynode 780 and detector 790 disposed adjacent to the exit aperture). Since ions are ejected symmetrically from the ion trap, only about half of the ejected ions are detected, thereby reducing detection efficiency by about fifty percent.

Figure 8:
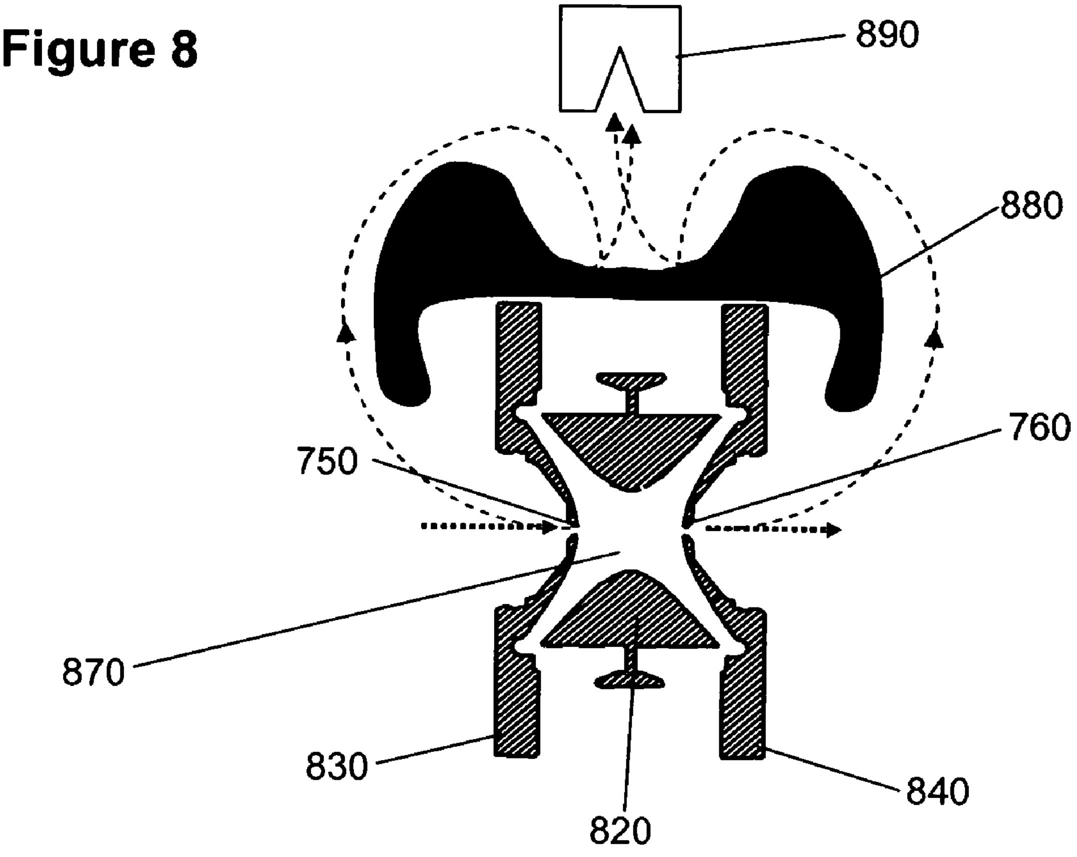
FIG. 8 illustrates the disposition of the ion conversion dynode and the detector for a three-dimensional quadrupolar ion trap according to yet a further aspect of the invention.

FIG. 8 illustrates how the invention can be extended to apply to the conventional three-dimensional quadrupolar ion trap 710 described above. A common ion conversion dynode 880, similar in geometry to the dynode 620 of the FIG. 6 embodiment, is positioned between ion trap 710 and a shared detector 890. Dynode 880 is shaped and positioned (and has the appropriate potential applied thereto) such that first and second groups of ions ejected in mutually opposite directions from ion trap 710 through, respectively, entrance and exit apertures 750 and 760 travel on paths that terminate at the central concave portion of the dynode upper surface. Dynode 880 responsively emits secondary particles that are directed to the entrance of detector 890, which generates a signal representative of the numbers of secondary particles incident thereon. In this manner, both groups of ions may be detected, resulting in enhanced detection sensitivity.

It is noted that the electrostatic field arising from the presence of dynode 880 may interfere with the injection of ions into ion trap 710 through entrance aperture 750. For this reason, it may be necessary to remove the applied potential from dynode 880 during the injection step, or, alternatively, to provide an appropriate focusing structure that compensates for the electrostatic field generated by dynode 880 and permits efficient injection.

It will be appreciated, that the embodiment illustrated in FIG. 8 may be modified such that the conversion dynode structure includes two dynodes or sets of dynodes, each dynode or dynode set being located adjacent to one of the entrance or exit apertures and positioned to receive one of the ion groups, in a manner similar to the embodiments depicted in FIGS. 3-6.

Unless otherwise defined, all technical and scientific terms used herein have the meaning commonly understood by one of ordinary skill in the art to which this invention belongs. The disclosed materials, methods, and examples are illustrative only and not intended to be limiting. Skilled artisans will appreciate that methods and materials similar or equivalent to those described herein can be used to practice the invention.

What is claimed is:

1. A quadrupolar ion trap system, comprising:

a quadrupolar ion trap configured to eject a first group of ions in a first direction and a second group of ions in a second direction different from the first direction;

an ion conversion dynode structure positioned to receive the first and second groups of ions and to responsively emit secondary particles; and a shared detector positioned to receive the secondary particles and to responsively generate a signal representative of the aggregate number of ions in the first and second groups of ions.

2. The quadrupolar ion trap system according to claim 1, wherein the first and second groups of ions are respectively ejected through first and second apertures.

3. The quadrupolar ion trap system of claim 1, wherein the ion conversion dynode structure includes a first dynode positioned to receive the first group of ions and to responsively emit a first group of secondary particles, and a second dynode positioned to receive the second group of ions and responsively emit a second group of secondary particles, and wherein the shared detector receives both the first and second groups of secondary particles.

4. The quadrupolar ion trap system of claim 3, further comprising a focusing structure for focusing the first and second groups of secondary particles onto the shared detector.

5. The quadrupolar ion trap system of claim 4, wherein the focusing structure includes first and second lenses for respectively focusing the first and second groups of secondary particles.

6. The quadrupolar ion trap system of claim 1, wherein the ion conversion dynode structure includes a first set of dynodes positioned to receive the first group of ions and to responsively emit a first group of secondary particles, and a second set of dynodes positioned to receive the second group of ions and responsively emit a second group of secondary particles, and wherein the shared detector receives both the first and second groups of secondary particles.

7. The quadrupolar ion trap system of claim 1, wherein the ion conversion dynode structure includes a common dynode that receives both the first and second groups of ions.

8. The quadrupolar ion trap of claim 7, wherein the common dynode has an upper surface facing the shared detector, the upper surface having a central concave portion on which the second particles are incident.

9. The quadrupolar ion trap system of claim 1, wherein the first and second groups of ions each include resonantly ejected ions and non-resonantly ejected ions, and the ion trap system is configured that a significant portion of the non-resonantly ejected ions travel on paths that do not result in the production of secondary particles that reach the shared detector.

10. The quadrupolar ion trap system of claim 1, wherein the first and second directions are approximately opposite.

11. The quadrupolar ion trap system of claim 1, wherein the quadrupolar ion trap is a two-dimensional ion trap having axially elongated rods.

12. The quadrupolar ion trap system of claim 11, wherein the first and second groups of ions have an axial extent when ejected from the ion trap, and the first and second groups of ions and/or the secondary particles associated therewith are axially focused such that the axial extent of the secondary particles at their point of arrival at the detector is substantially smaller than the axial extent of the ejected ions.

13. The quadrupolar ion trap system of claim 1, wherein the quadrupolar ion trap is a three-dimensional ion trap, and wherein the first and second groups of ions are respectively ejected through an entrance and an exit aperture.

14. A method for analyzing ions using an ion trap, the method comprising the steps of:

ejecting first and second groups of ions from the ion trap in, respectively, first and second directions, the first and second directions being different;

receiving the first and second groups of ions at a dynode structure and responsively emitting secondary particles; and, receiving the secondary particles at a shared detector and responsively generating a signal representative of the aggregate number of ions in the first and second groups of ions.

15. The method of claim 14, wherein the step of receiving the first and second groups of ions is performed at first and second dynodes.

16. The method of claim 14, wherein the step of receiving the first and second groups of ions is performed at a common dynode.

17. The method of claim 14, further comprising a step of focusing the secondary particles onto the shared detector.

18. The method of claim 14, further comprising a step of focusing at least one of the first and second groups of ions and the secondary particles in an axis defined by the direction of elongation of the ion trap.

19. The method of claim 14, wherein the first and second groups of ions each include resonantly ejected ions and non-resonantly ejected ions, and a significant portion of the non-resonantly ejected ions travel on paths that do not result in the production of secondary particles that reach the shared detector.

20. A quadrupolar ion trap system, comprising:

a quadrupolar ion trap configured to eject a first group of ions in a first direction and a second group of ions in a second direction different from the first direction; and a shared detector positioned to receive ions from or derived from the first and second groups of ions and to responsively generate a signal representative of the aggregate number of ions in the first and second groups of ions.

21. The quadrupolar ion traps system of claim 20, wherein the first and second groups of ions are respectively ejected through first and second apertures.

22. The quadrupolar ion trap system of claim 20, further comprising a focusing structure for focusing the ions from or derived from the first and second groups of ions onto the shared director.

23. The quadrupolar ion trap system of claim 20, wherein the first and second groups of ions each include resonantly ejected ions and non-resonantly ejected ions, and the ion trap system is configured that a significant portion of the non-resonantly ejected ions travel on paths that do not result in ions from or secondary particles derived from the non-resonantly ejected ions from reaching the shared detector.

24. A method for analyzing ions using an ion trap, the method comprising the steps of:

ejecting first and second groups of ions from the ion trap in, respectively, first and second directions, the first and second directions being different;

receiving ions from or secondary particles derived from the first and second groups of ions at a shared detector and responsively generating a signal representative of the aggregate number of ions in the first and second groups of ions.

25. The method of claim 24, further comprising a step of focusing ions from or secondary particles derived from the first and second groups of ions onto the shared detector.

26. The method of claim 24, wherein the first and second groups of ions each include resonantly ejected ions and non-resonantly ejected ions, and a significant portion of the non-resonantly ejected ions travel on paths that do not result in ions from or secondary particles derived from the non-resonantly ejected ions from reaching the shared detector.

* * * * *